United States Patent
Bjelland

(10) Patent No.: US 7,587,477 B2
(45) Date of Patent: Sep. 8, 2009

(54) OPTIMIZATION OF HANDOVER PROCEDURES IN GPRS

(75) Inventor: Frode Bjelland, Kopervik (NO)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 1061 days.

(21) Appl. No.: 10/491,356

(22) PCT Filed: Oct. 3, 2002

(86) PCT No.: PCT/NO02/00359

§ 371 (c)(1),
(2), (4) Date: Mar. 30, 2004

(87) PCT Pub. No.: WO03/032672

PCT Pub. Date: Apr. 17, 2003

(65) Prior Publication Data

US 2004/0258018 A1    Dec. 23, 2004

(30) Foreign Application Priority Data

Oct. 5, 2001    (NO) .................................. 20014865

(51) Int. Cl.
*G06F 15/173*    (2006.01)
*H04W 4/00*    (2006.01)
*H04W 36/00*    (2006.01)
(52) U.S. Cl. ..................... 709/223; 370/331; 455/436
(58) Field of Classification Search .................. 709/245, 709/246, 201–203, 216–230; 370/331; 455/436
See application file for complete search history.

(56) References Cited

U.S. PATENT DOCUMENTS

| 6,438,592 | B1 * | 8/2002 | Killian | 709/224 |
| 2002/0129165 | A1 * | 9/2002 | Dingsor et al. | 709/246 |
| 2003/0086395 | A1 * | 5/2003 | Shanbhag | 370/331 |
| 2004/0213179 | A1 * | 10/2004 | Lundin et al. | 370/329 |

OTHER PUBLICATIONS $3^{rd}$ Generation Partnership Protocol Technical Specification 23.060.*
3rd Generation Partnership Protocol Technical Specification 29.060.*

* cited by examiner

*Primary Examiner*—Yasin M Barqadle
(74) *Attorney, Agent, or Firm*—Roger S. Burleigh

(57) ABSTRACT

The present invention discloses a method related to Attach procedures and Routing Area Update (RAU) procedures in packet switched cellular networks, in particular GPRS and UMTS networks. When an MS roams from a routing area covered by several SGSNs in an SGSN pool into a routing area covered by one SGSN (new SGSN) outside the pool, the roaming request will be sent from the new SGSN to a default SGSN, which for the new SGSN is believed to be the old SGSN. The default SGSN will, unless it itself is the old SGSN, relay the roaming request to the SGSN (old SGSN) previously serving the MS. To avoid that the default SGSN has to monitor for a response of the request, and thereby occupying resources in the default SGSN, the default SGSN inserts (or when possible, leave unchanged) the address of the new SGSN in the request. The response of the request will therefore be transmitted directly from the old SGSN to the new SGSN and not via the default SGSN as described in the existing technical specifications.

13 Claims, 6 Drawing Sheets

The Old SGSN sends the Identification Response directly to the New SGSN

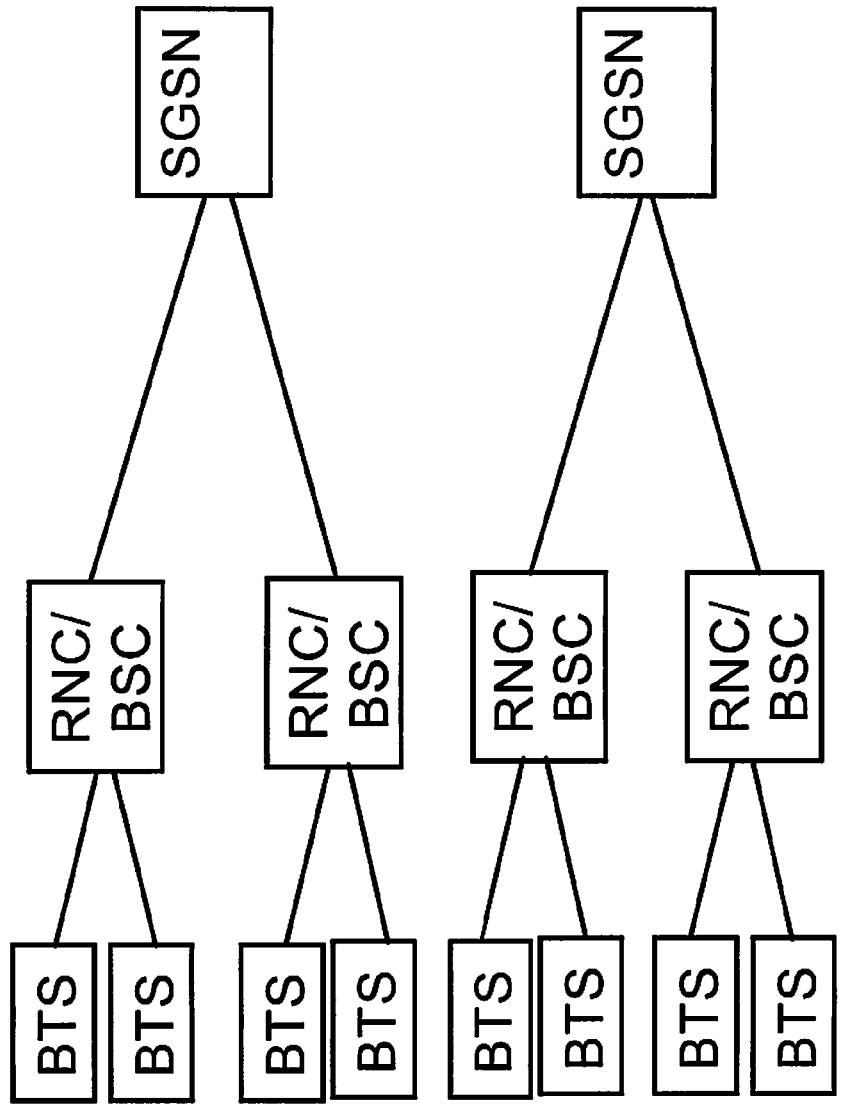
Figure 1: Relationship between RNC/BSC and SGSN in 3GPP release 4 (PRIOR ART)

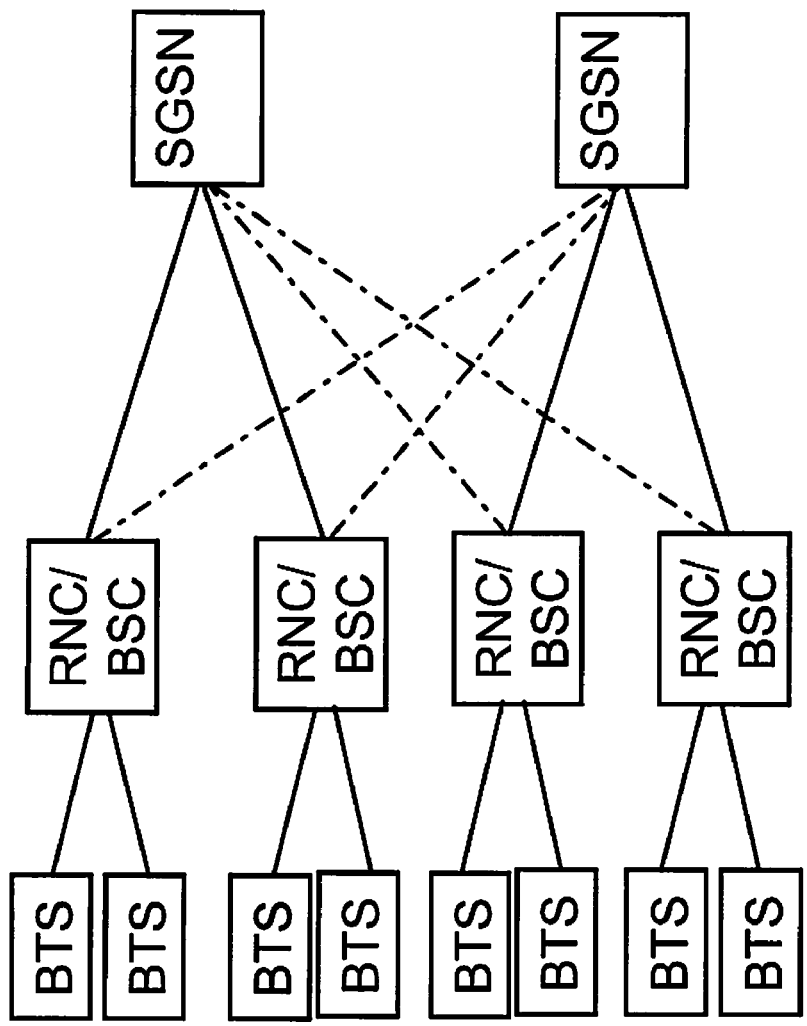
Figure 2: Relationship between RNC/BSC and SGSN in a pool concept (PRIOR ART)

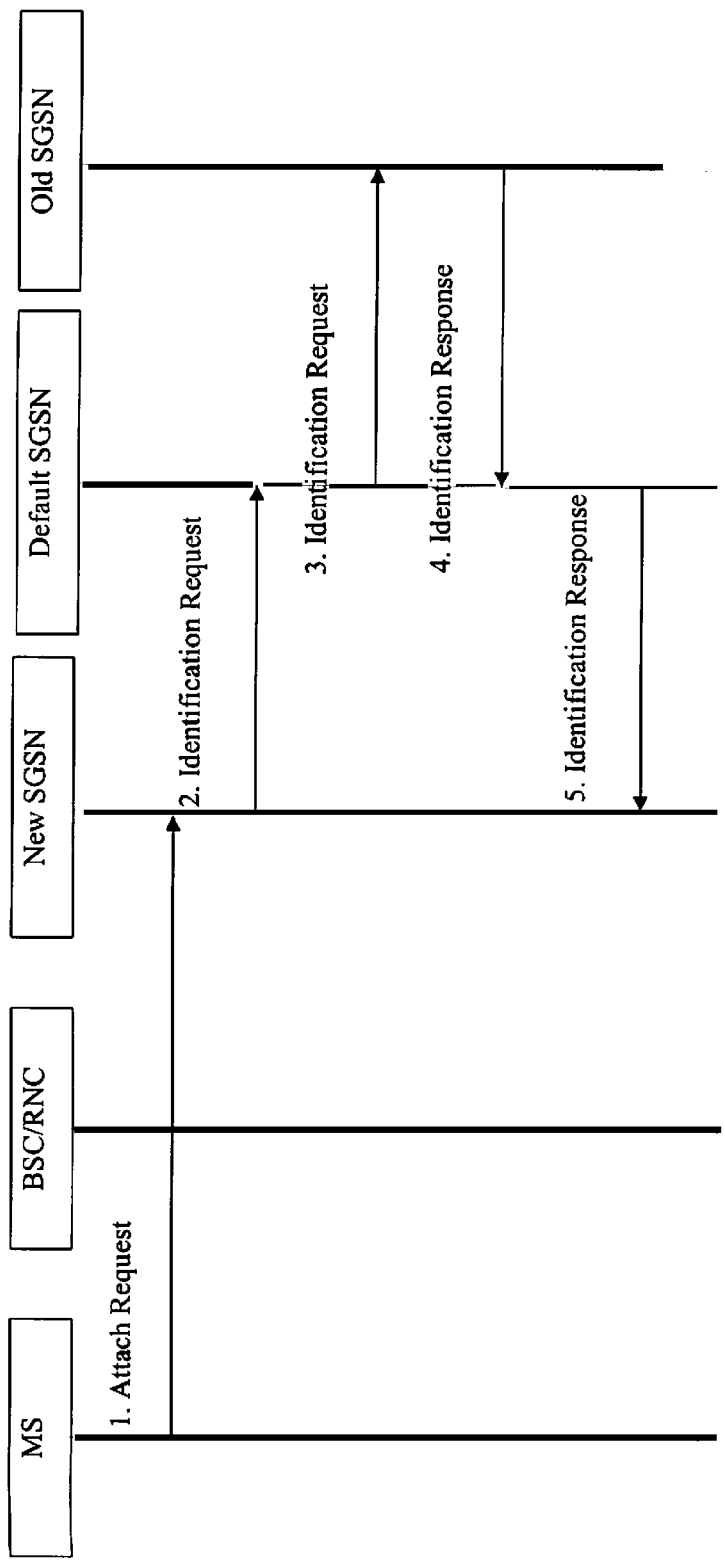
Figure 3: The Old SGSN must send the Identification Response through the Default SGSN
(PRIOR ART)

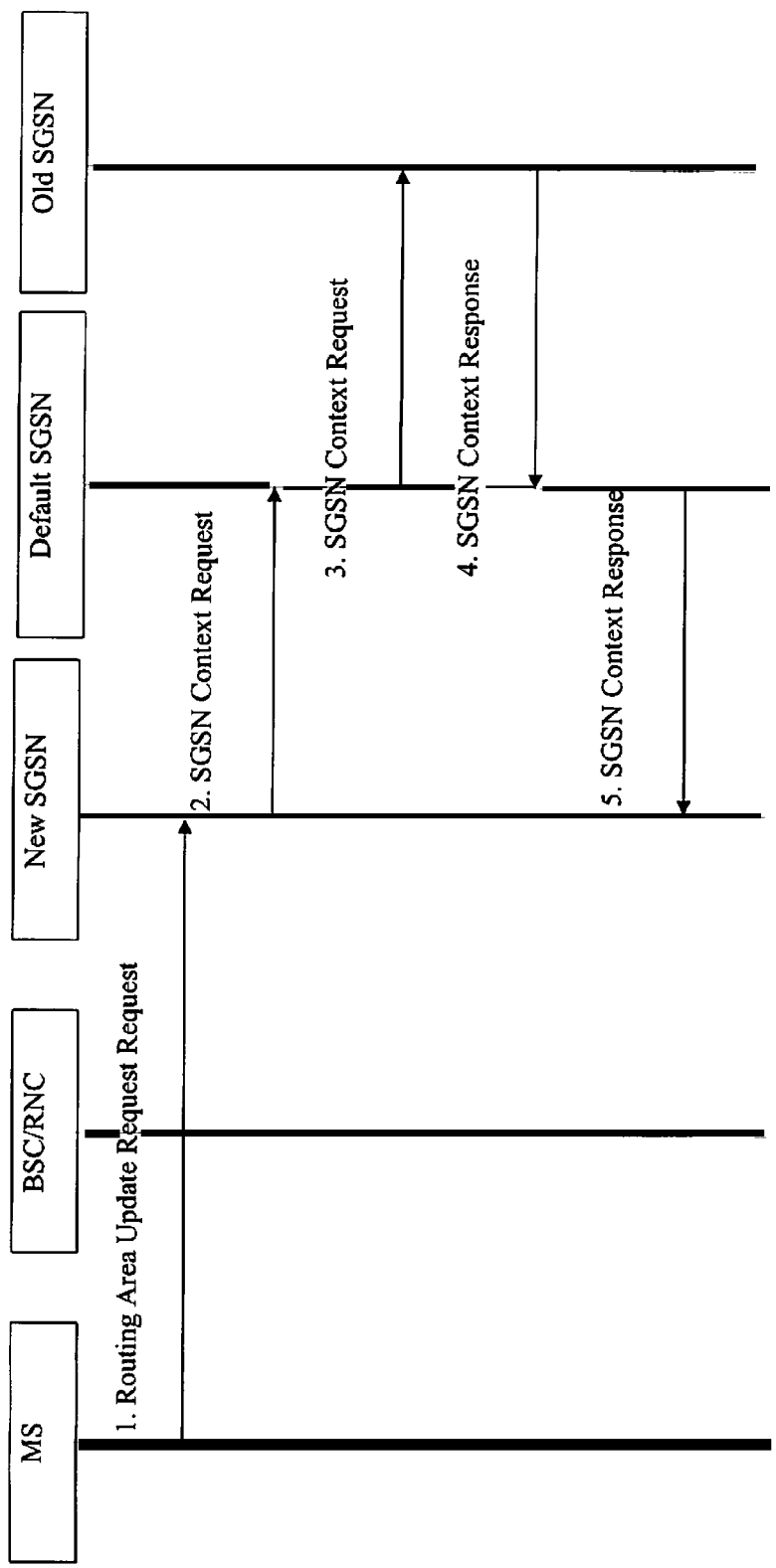
Figure 4: The Old SGSN must send the SGSN Context Response through the Default SGSN
(PRIOR ART)

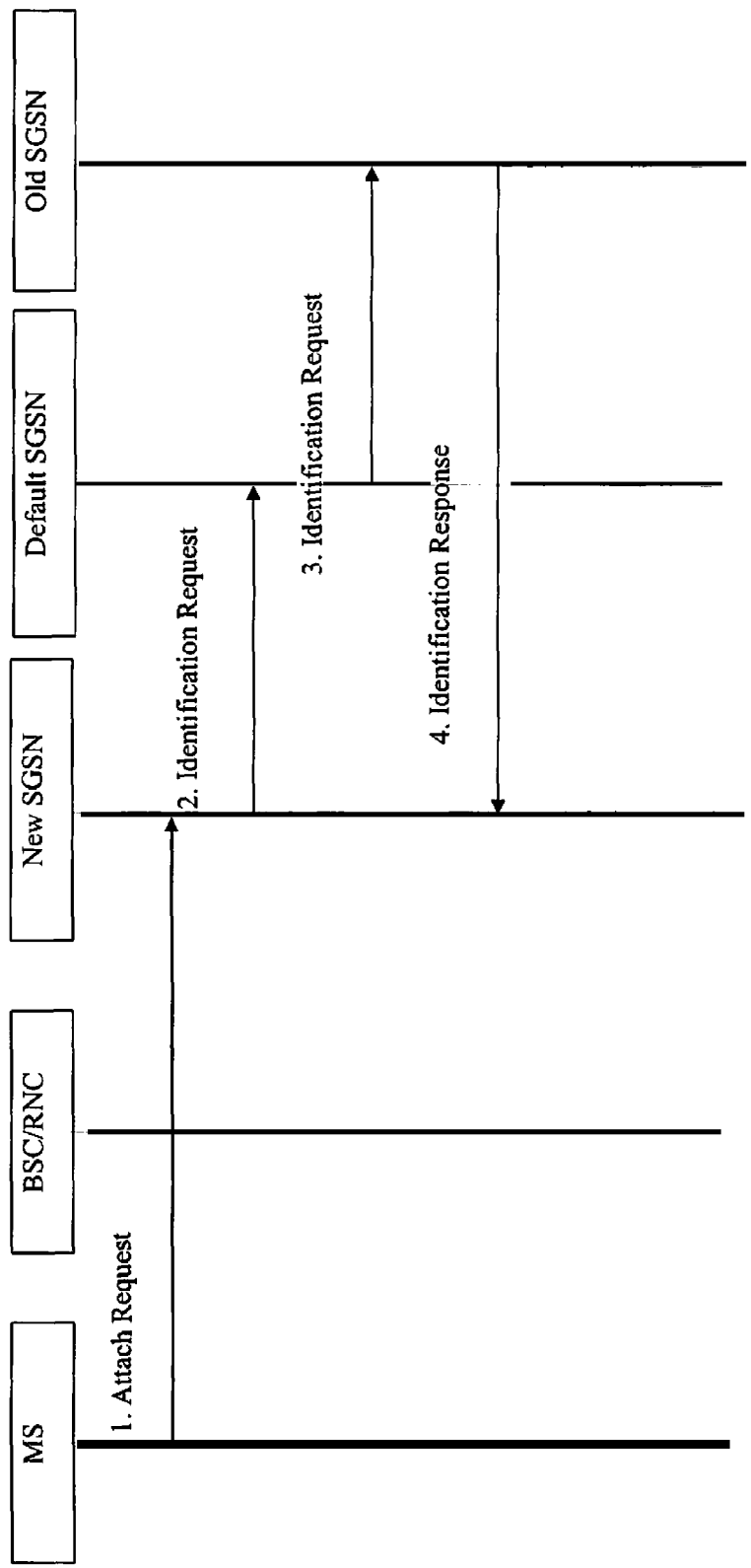
Figure 5: The Old SGSN sends the Identification Response directly to the New SGSN

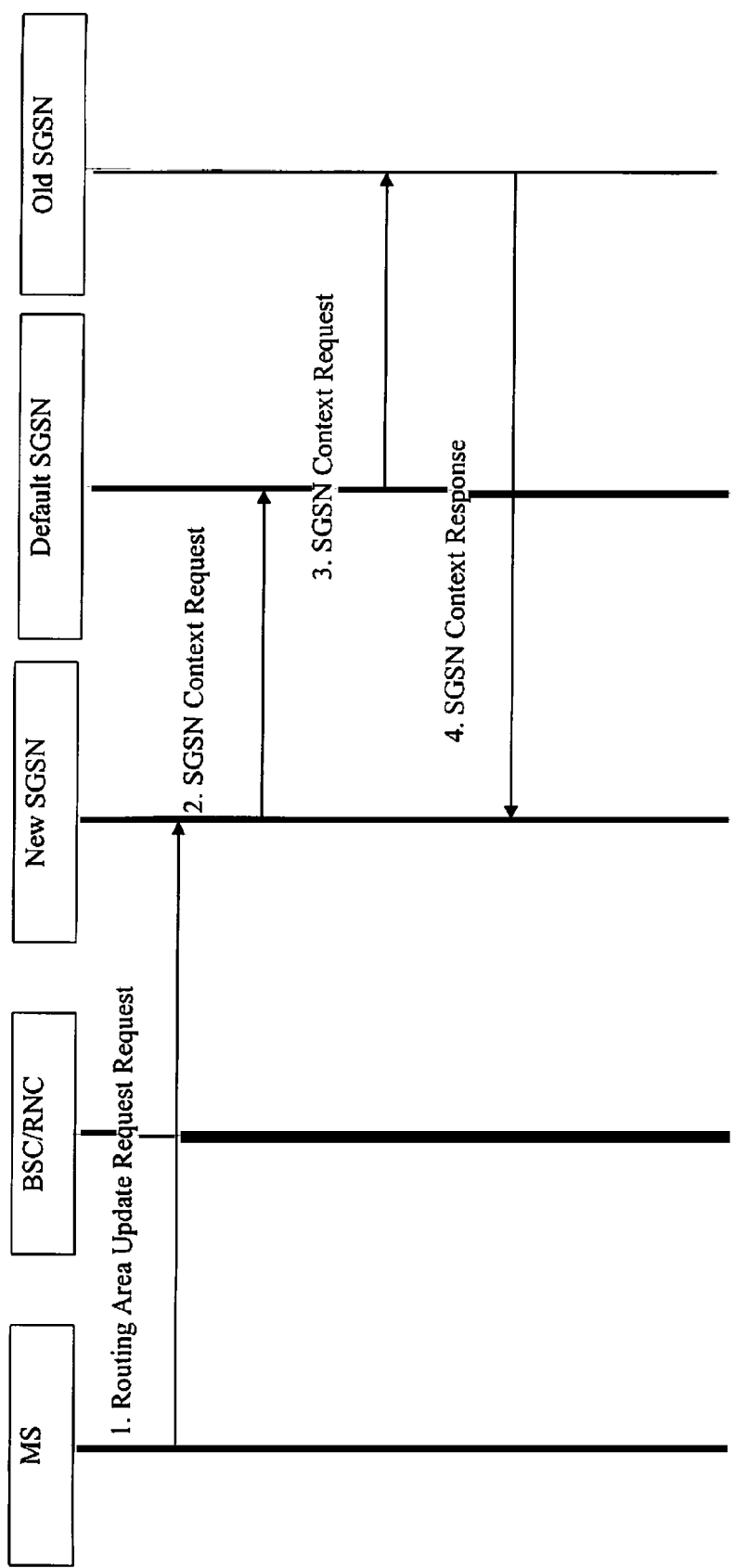
Figure 6: The Old SGSN sends the SGSN Context Response directly to the New SGSN

OPTIMIZATION OF HANDOVER PROCEDURES IN GPRS

FIELD OF THE INVENTION

The present invention is related to Attach procedures and Routing Area Update (RAU) procedures in packet switched cellular networks wherein several service nodes are connected to the same radio network. The invention will be described in the terminology of the UMTS and GPRS networks, well known for a person skilled in the art, and references will be made to the 3GPP ($3^{rd}$ Generation Partnership Project) Technical Specification 29.060 and 23.060.

BACKGROUND OF THE INVENTION

A packet switched cellular network such as GPRS or UMTS, comprises several nodes handling traffic flow and signalling within and in and out of the network. One such node is the SGSN node similar to the functionality of MSC/VLR of GSM. An SGSN is responsible for detecting MSs in its geographical area, registering them and keeping track of their movements within the routing area.

Until now, a radio network node is connected towards one and only one SGSN, as shown in FIG. 1. A radio network node is either an RNC (Radio Network Controller) or a BSC (Base Station Controller).

3GPP ($3^{rd}$ Generation Partnership Project), which is a standardisation body for 3rd generation mobile systems, is for the time being developing a concept where a radio network node is allowed to be connected towards several SGSNs, as shown in FIG. 2. The idea is to place several SGSNs in a pool, and that all of them cover the same geographical area, which then can be bigger than the area previously covered by one SGSN. As long as an MS is located within the pool area, the MS will be attached to the same SGSN. This has several advantages, e.g. better load sharing between SGSNs, reduced signalling in the core network, improved service performance, better scalability and easier upgrade of the nodes. Also, it opens up for several operators to share the radio network, or parts of it, while still having separate SGSNs. This is especially useful for operators having a 2G ($2^{nd}$ Generation) network, but who did not receive licenses for a 3G ($3^{rd}$ Generation) network, or vice versa. The sharing of radio network is also useful for operators who want to cut costs.

The dotted lines in FIG. 2 shows what is new with the pool concept, i.e. that an RNC or a BSC can be connected to two or more SGSNs.

When an MS is getting attached to an SGSN, the SGSN will allocate a P-TMSI (Packet-Temporary Mobile Subscriber Identity) value to the MS. In a pool concept, each of the SGSNs within the pool will have their own unique range of P-TMSI values. If the value range of each of the SGSNs is given to (known by) the surrounding nodes (BSCs, RNCs or other SGSNs), then these surrounding nodes will know to which of the SGSNs the MS is (or was) attached.

In some cases, however, the surrounding nodes will not know the P-TMSI ranges of each of the SGSNs in a pool. One example of this is when an MS roams into an area covered by an SGSN that is not aware of the pool. In this case, the new SGSN cannot uniquely identify the old SGSN to which the MS was attached. Another example is when the configuration effort is minimised so that the nodes outside an SGSN pool do not know about the internal structure of the SGSN pool. The solution to this problem is that one of the SGSNs in a pool, referred to as the default SGSN, will be appointed as a representative for the routing area covered by the pool. A new SGSN outside the mentioned routing area will look at the old Routing Area id of the MS in the received request (routing area update or attach), as usual, to determine which SGSN to contact. The default SGSN will be associated with that routing area id, and the new SGSN will therefore send a request to the default SGSN without being aware of the pool. The default SGSN will know the P-TMSI ranges of each of the SGSNs within the pool. Thus, the default SGSN can look at the received P-TMSI parameter, or the TLLI (Temporary Logical Link Identity) parameter that is based on the P-TMSI parameter if this is received instead, and forward the message to the correct SGSN. This aspect is already discussed within 3GPP ($3^{rd}$ Generation Partnership Project), and it is shown in FIG. 3 for the Attach procedure and in FIG. 4 for the Routing Area Update procedure. FIG. 3 and FIG. 4 show how the beginning of these two procedures must be done when using the existing procedures defined in 3GPP TS (Technical Specification) 29.060. Said TS defines the messages that are sent between two SGSNs, and the messages that are sent between an SGSN and a GGSN (Gateway GPRS Support Node, where GPRS stands for General Packet Radio Service).

Referring to FIG. 3, in step 1, the MS that previously was located in an SGSN pool area covered by the Default SGSN and the Old SGSN, roams into an area covered by the New SGSN, and sends an Attach Request message to the New SGSN. The New SGSN looks at the received 'old Routing Area' to find which SGSN to contact, and in this case it is the Default SGSN.

In step 2, the New SGSN sends an Identification Request message to the Default SGSN. The Default SGSN looks at the old P-TMSI to determine which SGSN within the pool handled the MS before it was roaming. The P-TMSI in this example belongs to the Old SGSN.

In step 3, the Default SGSN relays the Identification Request message to the Old SGSN. The Default SGSN must also keep information on from which SGSN it received the Identification Request message (i.e. the New SGSN) to be able to send the response to the correct SGSN.

In step 4, the Old SGSN returns an Identification Response message to the Default SGSN.

In step 5, the Default SGSN relays the Identification Response message to the New SGSN, and this is based on the information stored in step 3.

Now referring to FIG. 4, in step 1, the MS that previously was located in an SGSN pool area covered by the Default SGSN and the Old SGSN, roams into an area covered by the New SGSN, and sends a Routing Area Update Request message to the New SGSN. The New SGSN looks at the received 'old Routing Area' to find which SGSN to contact, and in this example it is the Default SGSN.

In step 2, the New SGSN sends an SGSN Context Request message to the Default SGSN. The Default SGSN looks at the old P-TMSI, or the TLLI (Temporary Logical Link Identity) parameter, which is based on the P-TMSI parameter if this is received instead, to determine which SGSN within the pool handled the MS before it was roaming. The P-TMSI, or the TLLI, in this example belongs to the Old SGSN.

In step 3, the Default SGSN relays the SGSN Context Request message to the Old SGSN. Since the Default SGSN must monitor the response for this message in the way the GTP (GPRS Tunnelling Protocol) protocol is defined today, the Default SGSN must change the 'IP address' and the 'TEID' (Tunnel Endpoint IDentifier) for where it wants to receive the response message. The Default SGSN must also keep information on from which SGSN it received the SGSN Context Request message (i.e. the New SGSN) to be able to send the response to the correct SGSN.

In step 4, the Old SGSN returns an SGSN Context Response message to the Default SGSN.

In step 5, the Default SGSN relays the SGSN Context Response message to the New SGSN, and this is based on the information stored in step 3.

The problem with the sequences in FIG. 3 and FIG. 4 is that the Identification Response message and the SGSN Context Response message must be sent through the Default SGSN, as shown in step 4. This means that the Default SGSN must keep some state information for this MS as well as some information on which SGSN it received the Identification Request message or SGSN Context Request message from, as described in step 3 for FIG. 3 and FIG. 4. This means that unnecessary resources are occupied and unnecessary processor load is generated in the Default SGSN. Also, this will slightly increase the time needed to perform a handover.

The concept of placing several SGSNs in a pool is not previously known in GSM (Global System for Mobile Communication). The above-described handover problems are new problems that appeared in the current standardisation of the pool concept within 3GPP, and therefore there are no known solutions to the problem.

SUMMARY OF THE INVENTION

It is an object of the present invention to provide an arrangement that eliminates the drawbacks described above. The features defined in the claims enclosed characterize this method.

The present invention relates to a method and system within a packet switched cellular network including at least one pool of first service nodes being able to service terminals in the same area and at least one second service node not included in the pool of said first service nodes, wherein the terminals are each allocated one temporarily identity by each of said at least one second service node, and wherein the terminals are each allocated one temporary identity from an identity range unique for said pool of said first service nodes, wherein the present invention, in response to a new service node within said at least one second service node receiving a first request message from one of the terminals previously served by an old service node associated with the pool of said first service nodes, sending a second request message from the new service node to a default service node also associated with the pool of said first service nodes and including a temporary identify of the terminal allocated by the old service node. In accordance with the teachings of the present invention, the default service node then identifies the old service node by means of the temporary identity included in the received second request message wherein an address of the new serving node is included in the second request message and relayed to the old service node. To return a response message to the new service node, the old service node then addresses the response message by means of the address included in the received second request message.

BRIEF DESCRIPTION OF THE DRAWINGS

In order to make the invention more readily understandable, the discussion that follows will refer to the accompanying drawings.

FIG. 1 shows the relationship between the nodes in a GPRS/UMTS network according to common practice, FIG. 2 shows the relationship between the nodes in a GPRS/UMTS network according to the pool concept introduced in a new release of the 3GPP standard (Release 5), FIG. 3 shows an Attach Procedure when an MS attaches a standalone SGSN (or an SGSN in another pool) after having been attached to a SGSN in a pool, FIG. 4 shows a Routing Area Procedure when an MS roams from an SGSN in a pool to a standalone SGSN (or an SGSN in another pool), FIG. 5 shows an Attach Procedure according to the present invention when an MS attaches a standalone SGSN (or an SGSN in another pool) after having been attached to an SGSN in a pool, FIG. 6 shows a Routing Area Procedure according to the present invention when an MS roams from an SGSN in a pool to a standalone SGSN (or an SGSN in another pool).

DESCRIPTION OF THE PRESENT INVENTION

Two embodiments of the present invention will now be described with reference to FIG. 5 and FIG. 6, respectively. The first embodiment describes two alternative solutions addressing an attach procedure, while the second embodiment describes a solution for the routing area update procedure.

In step 1 of FIG. 5, the MS that previously was located in an SGSN pool area covered by at least the Default SGSN and the Old SGSN, roams into an area outside the pool covered by the New SGSN, and sends an Attach Request message to the New SGSN. The New SGSN looks at the received 'old Routing Area' to find which SGSN to contact, and in this example it is the Default SGSN.

In step 2, the New SGSN sends an Identification Request message to the Default SGSN. The Default SGSN looks at the old P-TMSI to determine which SGSN within the pool handled the MS before it was roaming. The P-TMSI in this example belongs to the Old SGSN.

In step 3, the Default SGSN relays the Identification Request message to the Old SGSN. This message should now include the address of the New SGSN, and the Default SGSN should not monitor the response message from the Old SGSN.

In step 4, the Old SGSN returns an Identification Response message directly to the New SGSN.

According to the first embodiment of the present invention, the new functionality for this attached sequence is as follows:

The Default SGSN should include the address of the New SGSN when forwarding the Identification Request message to the Old SGSN.

This may be done in two ways. One alternative is that the Default SGSN leaves the 'Source IP Address' from the IP (Internet Protocol) layer of the Identification Request message unchanged when relaying the Identification Request message to the old SGSN. Normally, according to the Internet Protocol, this address would have been the address of the sender, i.e. the default SGSN, but by instructing the default SGSN to leave the address of the new SGSN in the 'Source IP Address' field unchanged when relaying the Identification Request message to the old SGSN, the old SGSN would think that the message was transmitted directly from the new SGSN, and return an Identification Response to the new SGSN.

A second and preferred alternative is that the Default SGSN inserts the 'Source IP Address' from the IP layer (or 'SGSN Address') as a parameter in the GTP (GPRS Tunnelling Protocol) part of the Identification Request message. The GTP is described in 3GGP TS 29.060, and is a protocol describing signalling messages sent between SGSNs and signalling messages sent between an SGSN and a GGSN. Now, if the Old SGSN receives the 'Source IP Address' (or 'SGSN Address') as a parameter in the GTP part of the Identification Request message, this IP address shall then be used when sending the Identification Response message. Consequently, in this alternative, the Old SGSN should not use the 'Source IP Address' from the IP layer when sending the Identification Response message, even though this is the normal behaviour.

In both cases, the Default SGSN does not have to monitor the Identification Response message from the Old SGSN. (The reason for why an SGSN sending an Identification Request message wants to monitor the Identification Response message is in case re-transmission of the Identification Request message is needed). Also, there is no need for the default SGSN to store any state information about the MS or the identity of the new SGSN.

FIG. 6 shows the message flow according to the second embodiment of the present invention. In step 1, the MS that previously was located in an SGSN pool area covered by the Default SGSN and the Old SGSN, roams into an area covered by the New SGSN, and sends a Routing Area Update Request message to the New SGSN. The New SGSN looks at the received 'old Routing Area' to find which SGSN to contact, and in this example it is the Default SGSN.

In step 2, the New SGSN sends an SGSN Context Request message to the Default SGSN. The Default SGSN looks at the old P-TMSI, or the TLLI parameter, which is based on the P-TMSI parameter if this is received instead, to determine which SGSN within the pool handled the MS before it was roaming. The P-TMSI, or TLLI, in this example belongs to the Old SGSN.

In step 3, the Default SGSN relays the SGSN Context Request message to the Old SGSN. This message should include the address of the New SGSN (both 'TEID' and 'SGSN IP Address') within the GTP part of the message, and this is already possible in the existing message.

In step 4, the Old SGSN returns an SGSN Context Response message directly to the New SGSN.

According to the second embodiment of the present invention, the new functionality for this routing area update sequence is as follows:

The Default SGSN should include the address of the New SGSN (both 'TEID' and 'SGSN IP Address') when relaying the SGSN Context Request message to the Old SGSN in the GTP part of the SGSN Context Request message. This means that the Default SGSN should not change this part of the message when receiving it from the New SGSN.

The result also of this embodiment is that The Default SGSN does not have to monitor the SGSN Context Response message from the Old SGSN, and there will be no need for the default SGSN to store any state information about the MS or the identity of the new SGSN.

The present invention gives the opportunity of the Old SGSN to send the Identification Response message and the SGSN Context Response message directly to the New SGSN, as shown in FIG. 5 and in FIG. 6, so that resources are not unnecessarily occupied in the Default SGSN, and a minimum of processing capacity is required. Also, this will slightly decrease the time needed to perform a handover, as one signalling step will be avoided The present invention is applicable for both GSM (Global System for Mobile Communication) GPRS and UMTS (Universal Mobile Telecommunication System) GPRS.

The invention claimed is:

1. Method in a packet switched cellular network including at least one pool of first service nodes operative to serve terminals in a first service area and at least one second service node not included in the pool of said first service nodes, wherein each terminal within said first service area is allocated a temporary identity from an identity range unique for said pool of first service nodes, said method comprising the steps of:
   a) in response to a new service node associated with said at least one second service node receiving a first request message from one of the terminals previously served by an old service node associated with the pool of said first service nodes, when said terminal roams from said first service area into an area serviced by said second service node, sending a second request message from the new service node to a default service node also associated with the pool of said first service nodes, said second request message including said temporary identity of the terminal allocated by the old service node;
   b) in the default service node, identifying the old service node by means of the temporary identity included in the received second request message;
   c) adding, by said default service node, an address of the new serving node to the second request message and relaying it to the old service node; and,
   d) in the old service node, returning a response message directly to the new service node by addressing the response message to the address of the new service node added by the default service node to the received second request message.

2. Method according to claim 1, wherein that the packet switched cellular network is a GPRS network and the serving nodes are SGSN nodes.

3. Method according to claim 2, wherein that the first request message is an Attach Request, the second request message is an Identification Request and the response message is an Identification Response.

4. Method according to claim 2, wherein that the first request message is a Routing Area Update Request, the second request message is an SGSN Context Request and the response message is an SGSN Context Response.

5. Method according to claim 2 wherein that the temporary identities are P-TMSIs.

6. Method according to claim 2 wherein that the temporary identities are TLLIs.

7. Method according to claim 2 wherein that the inclusion of the address of the new serving node in the second request message in step c) is carried through in the default serving node by leaving the source IP Address of the new serving node in the second request message unchanged when relaying the second request message to the old serving node.

8. Method according to claim 2 wherein that the inclusion of the address of the new serving node in the second request message in step c) is carried through in the default serving node by inserting the Source IP Address from the IP layer of the received second request message as a parameter in the GTP part of the second request message.

9. Method according to claim 8, wherein that in case the inclusion of the address of the new serving node in the second request message in step c) is carried through by inserting a Source IP Address as a parameter in the GTP part of the second request message, the old service node uses this Source IP Address as the destination IP address of the response message mentioned in step d).

10. Method according to claim 7 wherein that the second request message is an Identification Request message, and the response message is an Identification Response message.

11. Method according to claim 2 wherein that the inclusion of the address of the new serving node in the second request message in step c) is carried through in the default serving node by leaving unchanged the TEID and the SGSN IP Address of the new SGSN in the GTP part of the second request message.

12. Method according to claim 11, wherein that the second request message is an SGSN Context Request message.

13. Method according to claim 2 wherein that the default service node does not supervise the response message that the old service node will return as a result of the second request message being relayed in step c).

* * * * *